United States Patent [19]

Noll et al.

[11] Patent Number: 4,635,364
[45] Date of Patent: Jan. 13, 1987

[54] BRAKING ARRANGEMENT FOR A CHAIN SAW

[75] Inventors: Wilfried Noll, Waiblingen; Konrad Ehmann, Remshalden; Hans P. Stehle, Waiblingen; Wolfgang Dorner, Rottenburg; Günter Dietzsch, Waiblingen, all of Fed. Rep. of Germany

[73] Assignee: Andreas Stihl, Waiblingen, Fed. Rep. of Germany

[21] Appl. No.: 722,112

[22] Filed: Apr. 11, 1985

Related U.S. Application Data

[63] Continuation-in-part of Ser. No. 473,880, Mar. 10, 1983, abandoned.

[30] Foreign Application Priority Data

Mar. 13, 1982 [DE] Fed. Rep. of Germany ....... 3209162

[51] Int. Cl.⁴ .............................................. B27B 17/00
[52] U.S. Cl. .................... 30/381; 188/77 R; 188/166; 188/251 M
[58] Field of Search ................ 188/251 M, 77 R, 166; 192/107 M; 30/381

[56] References Cited

U.S. PATENT DOCUMENTS

| 2,089,080 | 8/1937 | Valentine | 192/107 M |
| 2,775,323 | 12/1956 | English | 188/251 M X |
| 2,989,153 | 6/1961 | Bouled | 188/251 M X |
| 3,092,214 | 6/1963 | Batchelor et al. | 188/251 M X |
| 3,269,489 | 8/1966 | Roth | 188/251 M X |
| 3,702,126 | 11/1972 | Eklund | 188/251 M |
| 3,791,493 | 2/1974 | Yameguchi et al. | 188/251 M |
| 3,945,478 | 3/1976 | Kellerman et al. | 192/107 M X |
| 4,049,090 | 9/1977 | Buell | 188/251 M |
| 4,091,896 | 5/1978 | Wieland et al. | 188/77 R X |

FOREIGN PATENT DOCUMENTS

| 665485 | 6/1963 | Canada | 188/251 M |
| 235473 | 6/1925 | United Kingdom | 188/251 M |
| 2030665 | 4/1986 | United Kingdom | 188/251 M |
| 720237 | 3/1980 | U.S.S.R. | 188/251 M |

Primary Examiner—George E. A. Halvosa
Attorney, Agent, or Firm—Walter Ottesen

[57] ABSTRACT

The invention is directed to a braking arrangement for a chain saw and includes a brake band and a brake drum which form friction partners with their associated friction surfaces during braking. At least the friction surface of one of the friction partners includes a material which is resistant to conversion to martensitic structure. Particularly suitable materials are those having a cubic face-centered lattice structure, such as, for example, austenitic steel or chrome-nickel steel.

3 Claims, 6 Drawing Figures

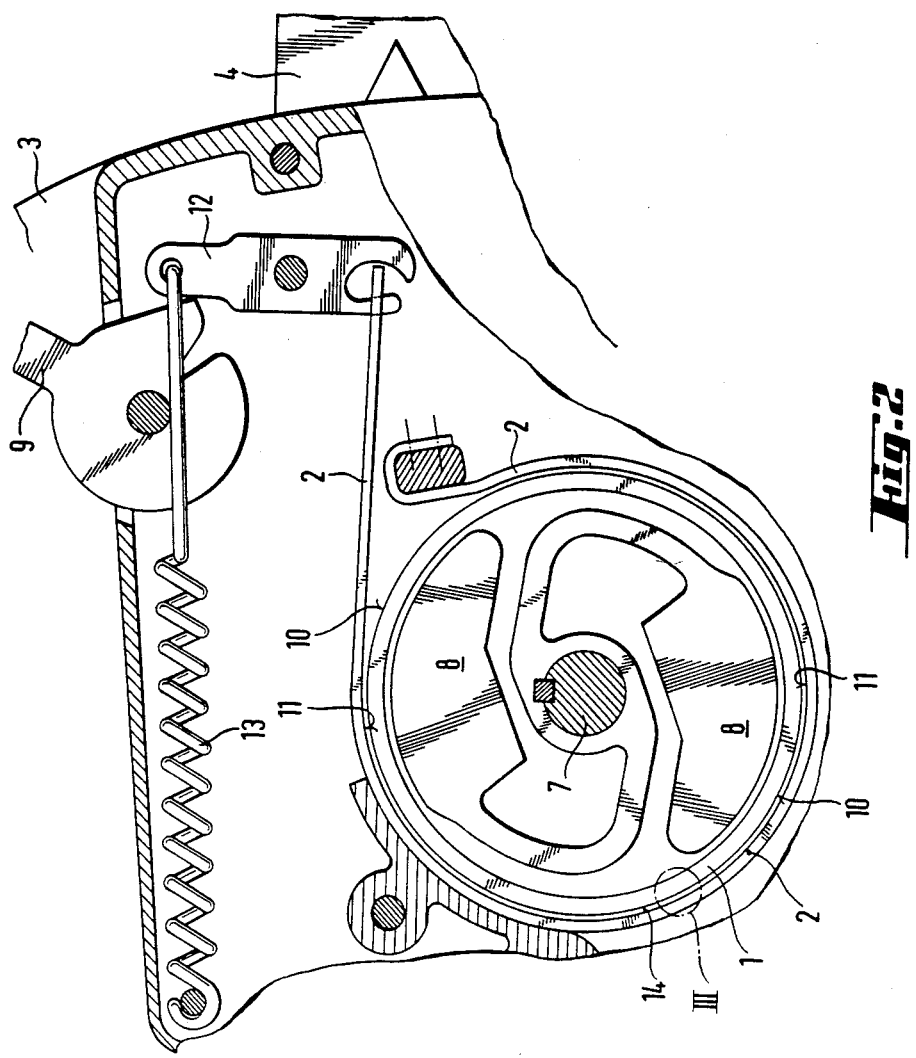
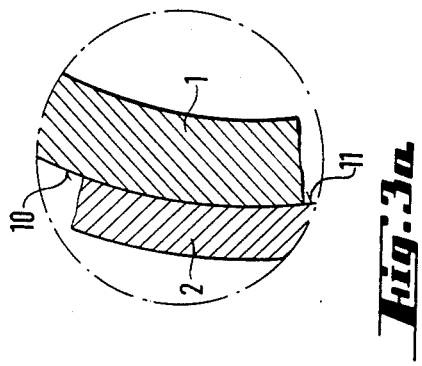
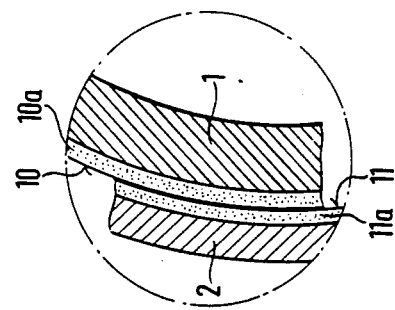

4,635,364

BRAKING ARRANGEMENT FOR A CHAIN SAW

RELATED APPLICATION

This is a continuation-in-part of application Ser. No. 473,880, filed Mar. 10, 1983 and is now abandoned.

FIELD OF THE INVENTION

The invention relates to a braking arrangement for a motor-driven chain saw. The braking arrangement includes a metal brake band and a metal brake drum, which, with their associated friction surfaces, form friction partners.

BACKGROUND OF THE INVENTION

With one known arrangement of this type, the braking member is a brake band made of an unalloyed heat treatable steel, while the brake drum is made of an unalloyed band steel. The braking action of this device is reduced when lubricant penetrates between the friction surfaces and forms a lubricating layer.

In chain saws, the saw chain is driven about a guide bar and must be lubricated with chain lubricating oil during operation to prevent the saw chain from overheating. Accordingly, chain lubricating oil is always present on the guide bar and on the saw chain and, because of the moving chain, some of this oil inevitably reaches the braking interface of the brake drum and the brake band. The presence of lubricating oil at the braking interface reduces the coefficient of friction and increases the time needed to bring the saw chain to standstill.

The braking arrangement of a chain saw must be capable to bring a moving saw chain to standstill in fractions of a second to protect the operator thereof in a dangerous condition such as kickback.

SUMMARY OF THE INVENTION

It is therefore an object of the invention to provide a braking arrangement for a chain saw wherein a lubricating film cannot become effective between the friction surfaces thereby shortening the time required to bring the saw chain to standstill.

The braking arrangement of the invention includes two friction partners at least one of which, at least in the region of its friction surface, includes a material which is stable or resistant to conversion into a martensitic structure.

If at least one of the friction surfaces of the friction partners comprises a metallic material which during a braking operation is not converted to a martensitic structure, that is into friction martensite, at least a reduction of the braking action due to a film of lubricating oil from the saw chain can be satisfactorily prevented. Due to the great adhesion action, that is the tendency for binding or seizing, which such materials have, the two friction partners fuse so strongly together during braking that the lubricant film cannot become effective to inhibit braking action. After the braking process, a shearing of the braking partners takes place. Particularly great adhesion forces occur during use of materials having cubic face-centered structures, such as, for example, austenitic steel or nickel, which are resistant to oxidation, so that chemical reactions with the lubricating oil can be prevented.

Pursuant to further features of the invention, the material may not only be resistant to oxidation, but may also be resistant to corrosion.

The friction surfaces may be formed by a layer of the brake drum and/or the brake band. This layer may comprise a metal having a cubic face-centered lattice structure, such as, for example, nickel, aluminum, or copper. The layer may also comprise an alloy, preferably an alloy of nickel, aluminum, or copper.

The friction surfaces may also comprise a compound material formed, for example, of unalloyed steel with austenitic steel.

The friction partners may also be comprised of the same material.

The friction surface of the braking member, and/or the entire braking member, may comprise a cubic, face-centered material which is resistant to conversion, and the brake drum may comprise a material having a cubic, body-centered lattice structure.

The braking body may be a band of a metal having a cubic face-centered lattice structure, such as, for example, nickel, copper, aluminum, or a nickel, aluminum, or copper alloy. The braking body may also be a band of an alloy, such as an aluminum, nickel or copper alloy.

BRIEF DESCRIPTION OF THE DRAWING

The invention will now be described with reference to the drawing wherein:

FIG. 2 is an enlargement of a portion of FIG. 1 and shows the braking arrangement of the invention;

FIG. 3a is an enlargement of the encircled portion III of FIG. 2, with the friction surfaces in contact with one another;

FIG. 3b shows a modification of the arrangement of FIG. 3a;

DESCRIPTION OF THE PREFERRED EMBODIMENTS OF THE INVENTION

Figure 1:
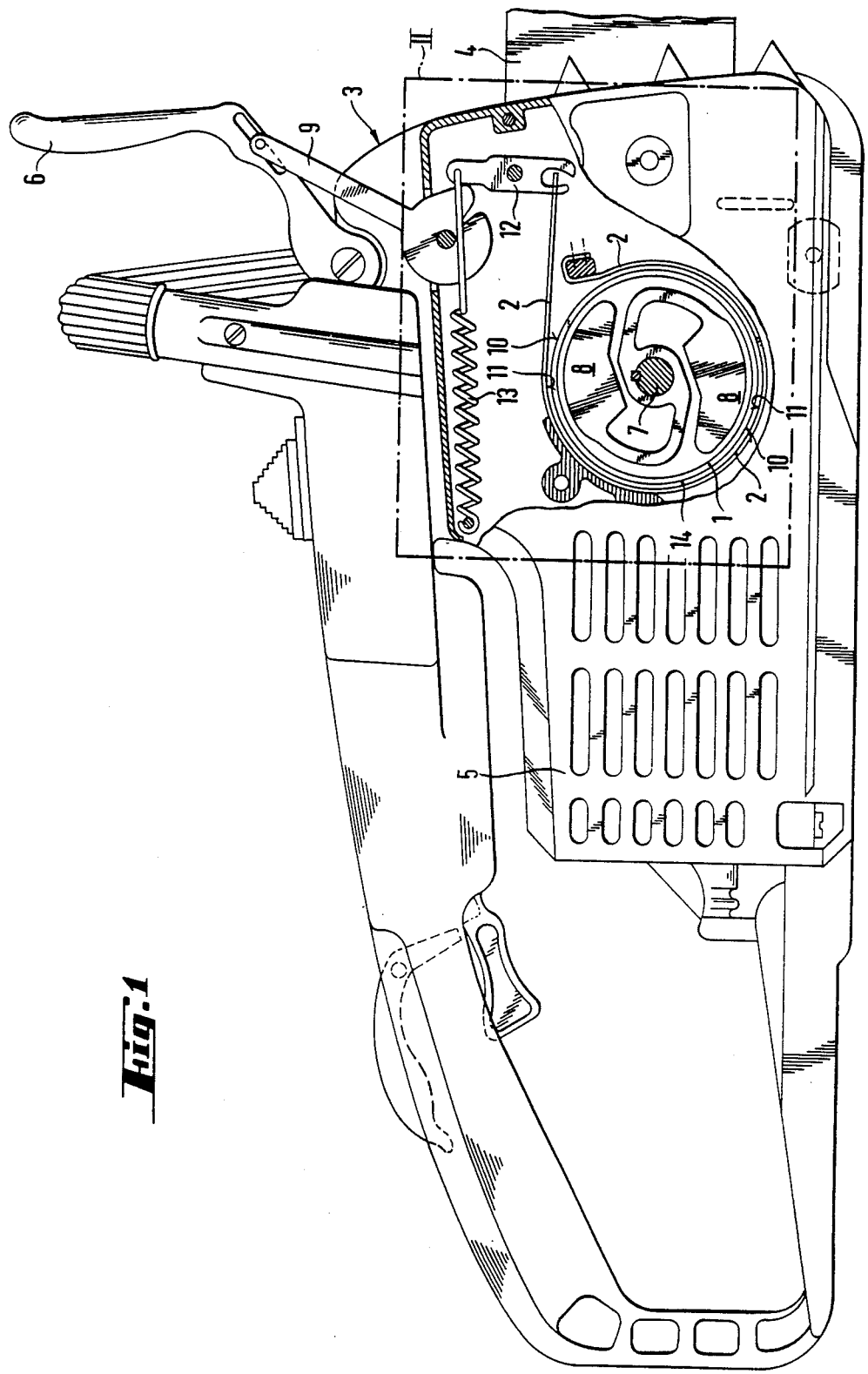
FIG. 1 is an elevation view, partially in section, of one embodiment of the braking arrangement of the invention for a portable motor-driven chain saw.

Referring now to FIG. 1 of the drawing, the braking arrangement includes a brake drum 1 and a brake or friction band 2 which surrounds the brake drum 1 with a spacing 14 in the operating position of the saw. The brake drum 1 is accommodated in a motor housing 3 of a portable motor-driven chain saw. The housing furthermore encloses a drive motor 5 for driving a saw chain (not shown) for movement on and along a guide bar 4 of the chain saw. The guide bar 4 projects outwardly from the housing 3. Fly weights 8 are connected with the crank shaft 7 of the motor and come into frictional contact with a centrifugal clutch formed by the brake drum 1 and the fly weights 8 when the motor has achieved a certain working speed. In this position, the saw chain is driven by means of a driving pinion which is connected with the brake drum 1.

The motor-driven chain saw also has a pivotally mounted finger guard lever 6 to which is mounted a drag lever 9. This lever 9 is operatively connected with the brake band 2 by means of a two arm lever 12 which is loaded by means of the spring 13. If the finger guard lever 6 is pivoted, for instance because the hand of the operator is withdrawn from the handle of the chain saw and strikes the lever 6, the brake band 2 is drawn tightly about the brake drum 1 by the lever linkage 6, 9, 12 due to the action of the spring 13, thus stopping the drive of the saw chain.

Figure 5:
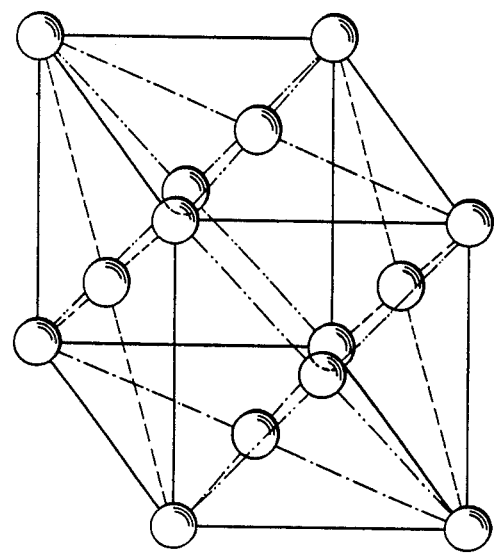
FIG. 5 shows a cubic face-centered structure.
Figure 4:
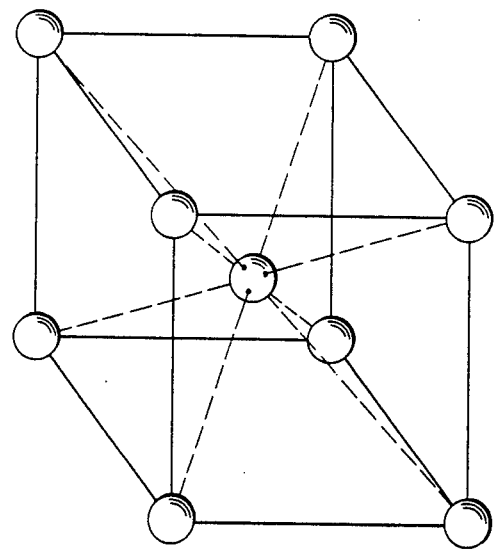
FIG. 4 shows a cubic body-centered structure.

The brake drum 1 comprises, for example, the material Z StE 300, which conforms to industrial material code 093 and has a cubic, body-centered structure (FIG. 4). Involved is a steel which can easily be deformed when cold, and which has an elastic limit of at least 300 N/mm$^2$. The brake band 2, on the other hand, comprises a metallic material having a cubic, face-centered lattice structure (FIG. 5). With such a material, the lattice structure is maintained even when it is quickly cooled off from high temperatures, so that no conversion into a martensitic structure results. Such a stable lattice structure prevents a friction martensite from forming which could reduce the adhesion forces between the contact of friction surfaces 10 and 11 of the brake drum 1 and the brake band 2 respectively, and hence could reduce the coefficient of friction to such an extent that the braking action would be affected. Due to the high adhesion forces of the material of the brake band, the braking action between the friction partners, namely the brake drum 1 and the brake band 2, can be improved to such an extent that a layer of lubricating oil caused by oil from the saw chain cannot be effective between the friction surfaces to inhibit the braking action.

A material having such a cubic, face-centered lattice structure which is stable to conversion into martensite is, for example, nickel or an austenitic steel. The following steels are, for example, suitable as austenitic steel: X 5 CrNi 189, X 12 CrNi 177 and X 10 CrNiMoTi 1810. These materials are particularly suitable for producing the brake band 2 since they have a particularly good adhesion, that is, a tendency to bind or seize. The thereby achievable braking action is improved still further in that the brake drum 1 has a similar lattice structure. Furthermore, these materials prevent the formation of an oxide between the friction partners, that is, the brake drum and the brake band, so that an alternate fusing and reshearing of these friction partners takes place between their friction surfaces during braking. Chrome-nickel steels pursuant to DIN 17440 are particularly suitable as austenitic steel; these steels have a very good resistance to corrosion and oxidation, and therefore prevent an attack by chemical action of a film of lubricating oil between the friction surfaces 10 and 11.

The friction surfaces 10 and 11 can also be formed by coatings 10a and 11a of the brake drum 1 and/or of the brake band 2, with the brake drum 1 comprising DIN ZStE 300 material, and the brake band 2 comprising an unalloyed or plain carbon heat treatable steel, for example C 75. This coating 10a, 11a has the advantage that the adhesion forces of a brake drum and of a brake band can also be subsequently increased by coating. The coating can be applied in a galvanic method, that is by electroplating, and may comprise nickel, copper, or aluminum, with nickel having a higher resistance to wear. The coating can also comprise a nickel-aluminum alloy, or a copper alloy, for example: NiCr 15 Fe, Al-CuSiMn, AlCuMg 2 and beryllium copper.

In place of a coating 10a, 11a the friction surface 10 of the brake drum 1, or the friction surface 11 of the brake band 2, can also be formed by a band-like layer of a compound material, whereby the carrier material may comprise an unalloyed heat-treatable steel, preferably a C35 steel. The side forming the friction surface preferably comprises nickel. This construction assures a greater durability of the friction partner than does a coating, because the thickness of the layer, which is approximately 0.5 mm, is considerably greater than a galvanic coating which has a thickness of only a few microns. The use of a brake band of a chrome-nickel steel also has the advantage that this material, even after several thousand braking actions, still assures an extremely good braking time and is therefore particularly suitable for use over a long period of time. Finally, both friction partners can comprise a material having a cubic face-centered lattice structure, or can comprise a corresponding coating or a compound material, so that not only the brake drum but also the brake band is prevented from being converted into a friction martensite. As a result, the braking action can be improved, and the braking time can be shortened; furthermore, the occurrence of a film of lubricating oil between the friction surfaces is optimally prevented. The coating can be applied by conventional surface coating methods, such as spraying, galvanizing, sintering, plating, et cetera.

It is understood that the foregoing description is that of the preferred embodiments of the invention and that various changes and modifications may be made thereto without departing from the spirit and scope of the invention as defined in the appended claims.

What is claimed is:

1. A braking arrangement for a motor-driven chain saw having a housing and a guide bar m ounted on the housing for accommodating a saw chain thereon which is lubricated during operation with lubricating oil, the braking arrangement comprising:

a metallic brake band which forms a first friction partner and has a first friction surface which becomes at least partially coated with a film of said lubricating oil during normal operation of the chain saw;

a metallic brake drum which forms a second friction partner and has a second friction surface which too becomes at least partially coated with a film of said lubricationg oil;

brake lever means operatively connected to said brake band and being pivotally mounted on the housing for movement between a ready position whereat said brake band is disposed in spaced relationship to said brake drum and a released position whereat said brake band is drawn tightly around said brake drum;

a brake spring connected to said brake lever means for resiliently biasing said brake lever means in a direction to cause said brake lever means to pull said brake band tightly about said brake drum when said brake lever means is in said released position;

release means operatively connected to said brake lever means for releasing the same to said released position thereby causing said brake band to be tightly drawn about said brake drum and bringing said friction surfaces into braking engagement with each other;

one of said friction partners being made of steel having a cubic body centered structure and the other friction partner, at least in the region of the friction surface corresponding thereto, including a material which is resistant to conversion to a martensitic structure and said conversion-resistant material being austenitic steel selected from the group consisting of X 5 CrNi 189, X 10 CrNiMoTi 1810, and X 12 CrNi 177 whereby said friction surfaces tightly fuse together during the braking action thereby preventing the films of oil on said friction surfaces from inhibiting the braking action and preventing further oil from reaching said surfaces.

2. A braking arrangement for a motor-driven chain saw having a housing and a guide bar mounted on the housing for accommodating a saw chain thereon which is lubricated during operation with lubricating oil, the braking arrangement comprising:

- a metallic brake band which forms a first friction partner and has a first friction surface which becomes at least partially coated with a film of said lubricating oil during normal operation of the chain saw;
- a metallic brake drum which forms a second friction partner and has a second friction surface which too becomes at least partially coated with a film of said lubricating oil;
- brake lever means operatively connected to said brake band and being pivotally mounted on the housing for movement between a ready position whereat said brake band is disposed in spaced relationship to said brake drum and a released position whereat said brake band is drawn tightly around said brake drum;
- a brake spring connected to said brake lever means for resiliently biasing said brake lever means in a direction to cause said brake lever means to pull said brake band tightly about said brake drum when said brake lever means is in said released position;
- release means operatively connected to said brake lever means for releasing the same to said released position thereby causing said brake band to be tightly drawn about said brake drum and bringing said friction surfaces into braking engagement with each other;
- at least one of said friction partners, at least in the region of the friction surface corresponding thereto, including a material which is resistant to conversion to a martensitic structure; said friction surface of said at least one friction partner being formed by a coating on the pertaining friction partner; said coating being a metal having a cubic face-centered lattice structure,
- said metal being selected from the group consisting of nickel, aluminum, and copper whereby said friction surfaces tightly fuse together during the braking action thereby preventing the films of oil on said friction surfaces from inhibiting the braking action and preventing further oil from reaching said surfaces.

3. A braking arrangement for a motor-driven chain saw having a housing and a guide bar mounted on the housing for accommodating a saw chain thereon which is lubricated during operation with lubricating oil, the braking arrangement comprising:

- a metallic brake band which forms a first friction partner and has a first friction surface which becomes at least partially coated with a film of said lubricating oil during normal operation of the chain saw;
- a metallic brake drum which forms a second friction partner and has a second friction surface which too becomes at least partially coated with a film of said lubricating oil;
- brake lever means operatively connected to said brake band and being pivotally mounted on the housing for movement between a ready position whereat said brake band is disposed in spaced relationship to said brake drum and a released position whereat said brake band is drawn tightly around said brake drum;
- a brake spring connected to said brake lever means for resiliently biasing said brake lever means in a direction to cause said brake lever means to pull said brake band tightly about said brake drum when said brake lever means is in said released position;
- release means operatively connected to said brake lever means for releasing the same to said released position thereby causing said brake band to be tightly drawn about said brake drum and bringing said friction surfaces into braking engagement with each other;
- at least one of said friction partners, at least in the region of the friction surface corresponding thereto, including a material which is resistant to conversion to a martensitic structure;
- said friction surface of said at least one friction partner being formed by a coating on the pertaining friction partner; said coating being an alloy selected from the group consisting of NiCr 15 Fe, AlCuSiMn, AlCuMg2, and beryllium alloy whereby said friction surfaces tightly fuse together during the braking action thereby preventing the films of oil on said friction surfaces from inhibiting the braking action and preventing further oil from reaching said surfaces.

* * * * *